(No Model.)
F. A. WELLS.
WATER CLOSET.
No. 381,660. Patented Apr. 24, 1888.
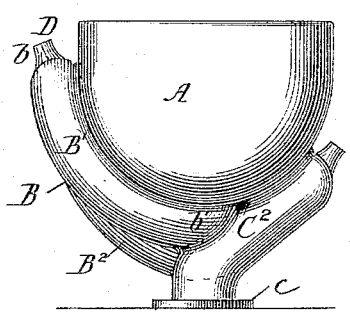
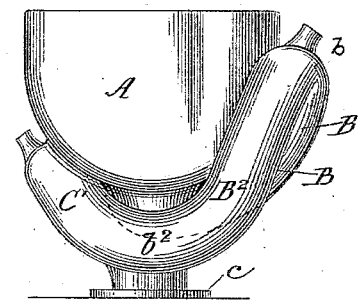
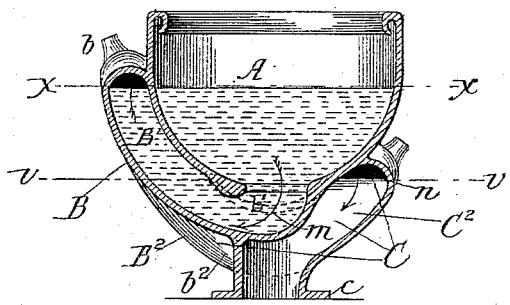
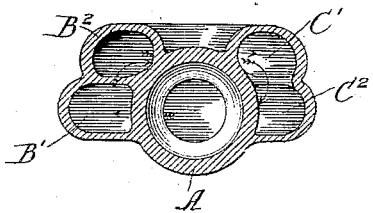
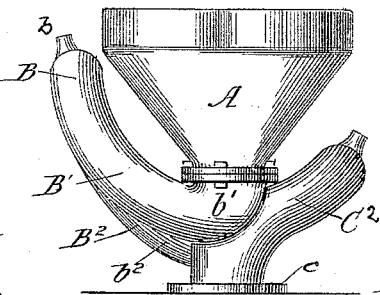
Witnesses:
Frank S. Blanchard
William F. Niemers
Inventor:
Frank A. Wells
By Chas. S. Burton
His Attorney

UNITED STATES PATENT OFFICE.

FRANK. A. WELLS, OF CHICAGO, ILLINOIS, ASSIGNOR OF ONE-THIRD TO THE N. O. NELSON MANUFACTURING COMPANY, OF ST. LOUIS, MISSOURI.

WATER-CLOSET.

SPECIFICATION forming part of Letters Patent No. 381,660, dated April 24, 1888.

Application filed October 15, 1885. Serial No. 179,931. (No model.)

*To all whom it may concern:*

Be it known that I, FRANK. A. WELLS, a citizen of the United States, residing at Chicago, in the county of Cook and State of Illinois, have invented certain new and useful Improvements in Water-Closets, which are fully described in the following specification.

The purpose of this invention is to provide a water-closet having a siphonic discharge-duct and a trap in addition to that formed between the hopper and the siphon, both the siphon and the additional trap being arranged disposed about the bowl and its stem within such vertical compass that the whole may be placed above the floor, and to accomplish this without making the hopper discharge at the side and without increasing the lateral compass of the hopper, siphon, and trap beyond that of the hopper and one limb of the siphon. The desirability of thus limiting the lateral compass arises from the fact that crockery-ware is preferred for such uses, and to avoid joints which cannot be kept tight without trouble and to increase the strength and avoid the necessity of supporting frame-work it is quite desirable that the hopper, siphon, and trap should be made integral. The cost of manufacturing such crockery-ware is largely dependent upon the space which it occupies in the kiln or oven in burning or baking; hence compactness of structure, limiting the lateral compass, contributes to cheapness of manufacture. Heretofore compactness has been attained only by giving the hopper a side discharge, which is objectionable for well-known reasons.

This invention consists in disposing the several limbs of the siphon and trap in a circle around the hopper, instead of developing them in a transverse vertical plane—that is, so that the centers of the several limbs or branches lie in a circle about the center of the hopper, instead of in a line with that center.

In the drawings, Figure 1 is a right side elevation. Fig. 2 is a vertical section through $y\ y$ on Fig. 1. Fig. 3 is a front elevation. Fig. 4 is a rear elevation. Fig. 5 is a horizontal section through the plane $x\ x$ on said elevations. Fig. 6 is a section through $v\ v$ on Fig. 2, and Fig. 7 is a front elevation of a form with a detachable hopper.

A is the hopper.

B is the siphon, having the two limbs B' and B². The former communicates with the hopper at the center of the bottom, and thence droops slightly to form the loop $b'$ and extends up alongside the bowl, and curves over to the rear and merges in the limb B², which passes down alongside the bowl and behind the limb B', and, curving under the hopper, becomes the first section of the S-trap C, its lower curve or loop, $b^2$, which constitutes the trap, hanging a few inches lower than the lowest point of the loop or trap $b'$. Thence the middle section, C', of the S-trap C curves up on the side of the hopper opposite the siphon B, its lower wall at its highest point, $n$, being enough higher than its upper wall at the lowest point, $m$, of the loop $b^2$ to make a water-seal of about two inches above the trap. From the point $n$ the discharge-section C² of the S-trap C curls down in front of the section C' and alongside of the loop $b'$, and turns underneath the latter and discharges directly downward under the center of the hopper, terminating in a flange, $c$, by which the closet is adapted to be secured both to the soil-pipe and to the floor.

The siphon B has at its crest $b$ the vent and exhaust-duct D, which will be connected with any of the well-known devices for exhausting the air from the siphon, and through which the air will enter to "break" the siphon at the proper time and permit the water to fall to the line $v\ v$, Fig. 2, leaving the two traps formed by the loops $b'$ and $b^2$ filled with water.

In respect to its action this closet is precisely like other well-known forms, and need not be explained.

In manufacture the siphon and traps may be formed integral without the hopper, terminating at the point where the hopper is to be connected in the flange $a$, as seen in Fig. 7. Any hopper may then be attached.

I claim—

1. In combination with the hopper, the siphon communicating with it at the bottom and having both its ascending and its descending limbs disposed adjacent to the hopper, substantially as set forth.

2. In combination with the hopper, the siphon by which it is evacuated and the trap between the siphon and the soil-pipe, both the ascending and the descending branches of both the siphon and the trap being disposed adjacent to the hopper.

3. In combination with the hopper, the siphon formed integrally therewith, both the ascending and the descending portion of the discharging-duct being adjacent to the hopper-chamber, substantially as set forth.

4. In combination with the hopper, the siphon and the trap between it and the soil-pipe, both formed integrally with the hopper, both the ascending and the descending branches of the siphon and the trap being disposed adjacent to the hopper-chamber, substantially as set forth.

5. In combination with the hopper having a central discharge-mouth, the siphon communicating with it at such discharge-mouth, and having both its ascending and descending limbs disposed adjacent to the hopper, substantially as set forth.

6. In combination with the hopper having a central discharge-mouth, the siphon communicating with it at such discharge-mouth, and the trap between the siphon and the soil-pipe, all the ascending and the descending branches of both the siphon and the trap being disposed adjacent to the hopper, substantially as set forth.

7. In combination, substantially as set forth, the hopper, siphon, and trap formed integrally, the hopper having a central discharge, the ascending and descending ducts of both the siphon and the trap being disposed adjacent to the hopper, and the discharge branch of the trap being produced downward and curved underneath the center of the hopper to form a central supporting-stem for the entire integral structure, substantially as set forth.

In testimony whereof I have hereunto set my hand, in the presence of two witnesses, at Chicago, Illinois, this 7th day of October, A. D. 1885.

FRANK. A. WELLS.

Attest:
CHAS. S. BURTON,
WILLIAM F. WIEMERS.